United States Patent [19]

Angermaier et al.

[11] Patent Number: 5,421,196

[45] Date of Patent: Jun. 6, 1995

[54] METHOD FOR MONITORING THE REPORTING OF MISFIRINGS IN AN INTERNAL COMBUSTION ENGINE THROUGH VARIOUS SUBMETHODS

[75] Inventors: Anton Angermaier, Landshut; Manfred Wier, Wenzenbach, both of Germany

[73] Assignee: Siemens Aktiengesellschaft, Munich, Germany

[21] Appl. No.: 167,493

[22] Filed: Dec. 14, 1993

[30] Foreign Application Priority Data

Dec. 14, 1992 [EP] European Pat. Off. ............ 92121261

[51] Int. Cl.⁶ .............................................. G01L 23/22
[52] U.S. Cl. .................................................. 73/117.3
[58] Field of Search ........................................ 73/117.3

[56] References Cited

U.S. PATENT DOCUMENTS

| | | |
|---|---|---|
| 5,088,318 | 2/1992 | Osawa . |
| 5,116,259 | 5/1992 | Demizu et al. ............... 73/117.3 |
| 5,119,783 | 6/1992 | Komurasaki ................. 73/117.3 |
| 5,127,262 | 7/1992 | Demizu et al. ............... 73/117.3 |
| 5,197,325 | 3/1993 | Tamura et al. ............... 73/117.3 |
| 5,239,473 | 8/1993 | Ribbens et al. .............. 73/117.3 |

FOREIGN PATENT DOCUMENTS

4117656 12/1991 Germany .
4035957 5/1992 Germany .
WO92/11522 7/1992 WIPO .

OTHER PUBLICATIONS

Japanese Patent Abstract No. 1 210 840, published Aug. 24, 1989 (Kurokawa Kaneyoshi).

*Primary Examiner*—Richard E. Chilcot, Jr.
*Assistant Examiner*—Jewel V. Artis
*Attorney, Agent, or Firm*—Herbert L. Lerner; Laurence A. Greenberg

[57] ABSTRACT

A method for monitoring a report of misfires in an internal combustion engine through at least two different submethods includes forming one subgroup from at least two submethods. A weighting graph containing weighting values dependent on operating parameters of a vehicle is assigned to each submethod, and the values are a measure of reliability of a report of the submethod. A weighting value is read out of the associated weighting graph upon each report in a submethod. The weighting values of the submethods of one subgroup are added to make a reference value. The reference value is compared with a limit value, and a misfire report is confirmed if the reference value is greater than the limit value.

7 Claims, 1 Drawing Sheet

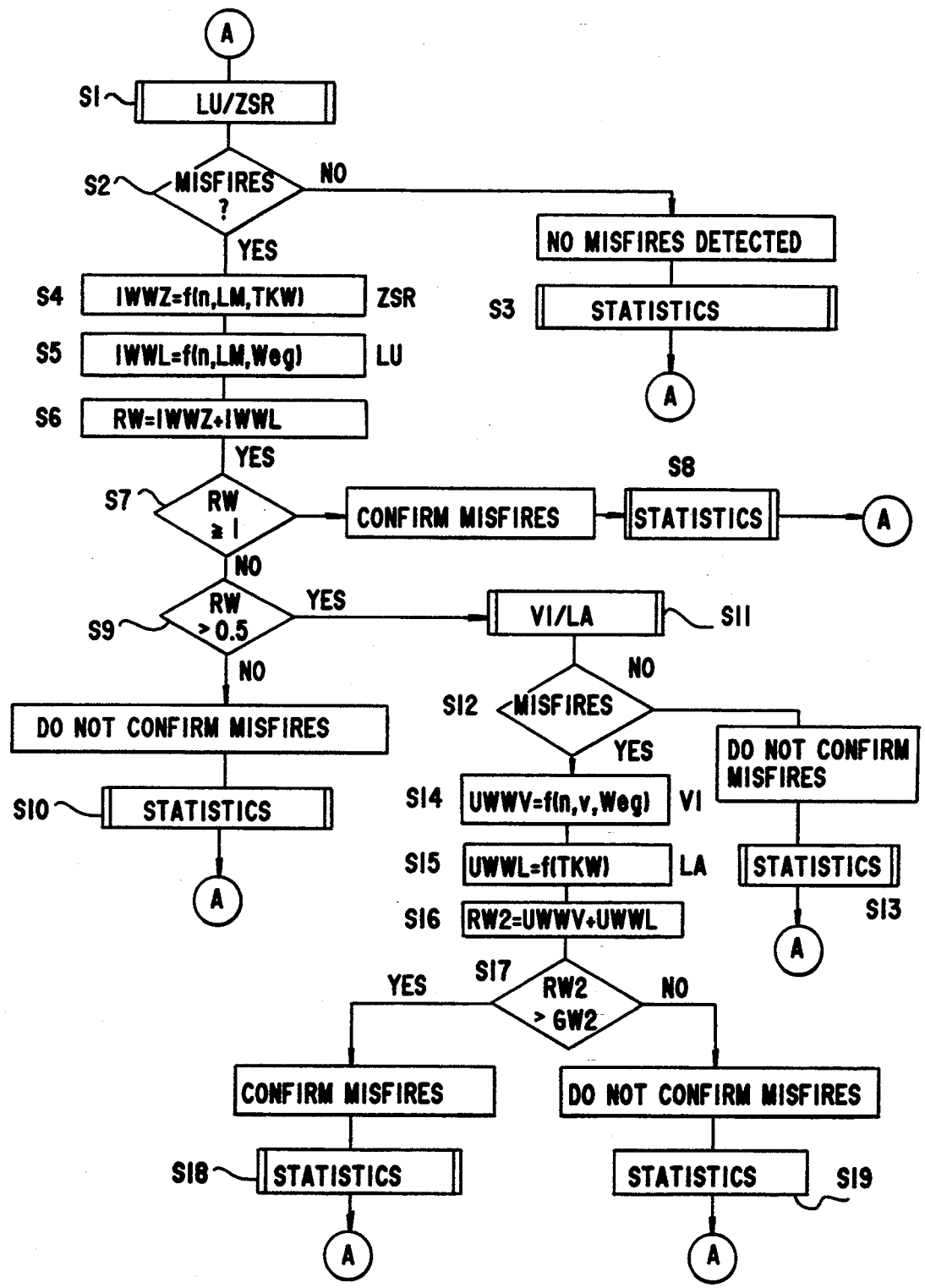

METHOD FOR MONITORING THE REPORTING OF MISFIRINGS IN AN INTERNAL COMBUSTION ENGINE THROUGH VARIOUS SUBMETHODS

BACKGROUND OF THE INVENTION

1. Field of the Invention

The invention relates to a method for monitoring the reporting of misfirings in an internal combustion engine by combining a plurality of submethods through a weighted combination of such methods, to increase the reliability with which misfiring is detected.

Misfiring in the operation of an internal combustion engine must be detected to make it possible to counteract the attendant increased pollutant emissions and to protect the catalyst against overheating.

A number of methods are already known for detecting misfiring.

Those methods have varying reliability, particularly as a function of the current or present operating point of the engine, so that if only one method is exclusively used, reliable misfiring detection is not assured in all operating ranges.

German Published, Non-Prosecuted Application DE 40 35 957 A1 describes a way in which a method for evaluating engine roughness is therefore combined with a method for monitoring ignition.

Published International Application WO 92/11522 describes a diagnostic unit for detecting misfiring, in which from among various methods for detecting misfiring, one or more methods are selected in accordance with the operating range of the engine, with the methods selected being suitable for detecting a misfire in that range.

SUMMARY OF THE INVENTION

It is accordingly an object of the invention to provide a method for monitoring the reporting of misfirings in an internal combustion engine through various submethods, which overcomes the hereinafore-mentioned disadvantages of the heretofore-known methods of this general type and which makes it possible with even greater certainty to indicate whether or not a misfire has occurred, for all operating states of the vehicle and of the engine.

With the foregoing and other objects in view there is provided, in accordance with the invention, a method for monitoring a report of misfires in an internal combustion engine through at least two different submethods, which comprises forming one subgroup from at least two submethods; assigning a weighting graph containing weighting values dependent on operating parameters of a vehicle to each submethod, the values being a measure of reliability of a report of the submethod; reading a weighting value out of the associated weighting graph upon each report in a submethod; adding the weighting values of the submethods of one subgroup to make a reference value; and comparing the reference value with a limit value, and confirming a misfire report if the reference value is greater than the limit value. This provides a weighted combination of a plurality of submethods for misfiring detection.

The known methods for misfiring can be classified in the following categories, among others:

a) methods that make it possible to ascertain globally whether or not a misfire has occurred (methods not dependent on particular cylinders), and b) methods that additionally make it possible to indicate in which cylinder the misfire occurred (cylinder-specific methods).

In the method of the invention, in its most general form, a plurality of submethods are carried out simultaneously, for cylinder-specific or cylinder-independent detection of misfires.

If one or more of these submethods then indicate a misfire, so-called "weighting values" are assigned to these submethods. In other words, as a function of the current operating parameters of the engine and the vehicle, a numerical value from the weighting graphs associated with the individual submethods is assigned to each individual submethod, with this value representing a measure for the reliability of that submethod. These numerical values have been ascertained beforehand for the applicable vehicle by means of statistical investigations on a test bench, under various operating conditions, and stored in memory.

The weighting values of the various submethods are added up to make a reference value, which is compared with predeterminable limit values. These limit values were likewise obtained by statistical investigations on the vehicle test bench.

If the reference value is greater than the limit value, then it can be stated with very high probability that a misfire has in fact occurred. The misfire report is confirmed.

If the reference value is less than the limit value, then the probability that a misfire has actually occurred is slight. It should instead be assumed that a misdetection has occurred. The misfire is not confirmed.

Another option is to combine the submethods into subgroups and to make the method a multi-step method, for instance with two steps.

In the first method step, for instance, a plurality of cylinder-specific submethods for misfiring detection are carried out in parallel, for instance the evaluation of the non-concentricity of the crankshaft, monitoring the ignition current on the primary or secondary side, or monitoring the actuation of the injection valves, as a first subgroup.

If one or more of these submethods in this subgroup then indicate a misfire, then once again "weighting values" are assigned to these submethods, in that as a function of the current operating state of the engine and the vehicle, a numerical value from weighting graphs is assigned into each individual submethod, with this numerical value representing a measure for the reliability of that submethod.

The weighting values of the various methods are added up to make a reference value, which is compared with predeterminable limit values.

The reference value being obtained is then compared not merely with one limit value but rather with two limit values, that is a limit value and a range value below it.

In accordance with a further mode of the invention, the submethods for cylinder-specific detection of misfiring include: evaluating non-concentricity of a crankshaft; monitoring ignition current to individual cylinders; monitoring a combustion chamber pressure of the individual cylinders; monitoring combustion by means of photography; measuring ion current at the spark plug; and monitoring injection valves. In a yet further mode of the invention, the submethods include: monitoring an exhaust gas temperature; monitoring an exhaust gas composition; monitoring vibration of an engine; and monitoring noise production by the engine.

If the reference value is between the limit value and the range value, then it is not possible to state unequivocally whether a misfire has actually occurred or a misdetection has taken place. In this range, a plausibility check is therefore made, with a second subgroup including, for instance, cylinder-independent submethods for misfiring detection, such as by observation of the exhaust gas temperature, engine vibration or the proportion of oxygen in the exhaust gas, using a lambda sensor. It is not until the submethods of this subgroup also lead to the conclusion of a misfire that the misfiring report is confirmed.

Once again, the reliability of these cylinder-independent submethods is ascertained through weighting graphs as a function of the operating parameters.

The method can naturally be performed in reverse. In other words, the indication of whether or not a misfire has occurred is monitored in the first step, using cylinder-independent submethods. If an unequivocal finding cannot be made, then in the second method step, monitoring by cylinder-specific submethods is carried out in addition.

In order to identify the cylinder in which a misfire has occurred, a cylinder-specific submethod must always be employed as well.

Other features which are considered as characteristic for the invention are set forth in the appended claims.

Although the invention is illustrated and described herein as embodied in a method for monitoring the reporting of misfirings in an internal combustion engine through various submethods, it is nevertheless not intended to be limited to the details shown, since various modifications and structural changes may be made therein without departing from the spirit of the invention and within the scope and range of equivalents of the claims.

The method of operation of the invention, however, together with additional objects and advantages thereof will be best understood from the following description of specific embodiments when read in connection with the accompanying drawing.

BRIEF DESCRIPTION OF THE DRAWING

The figure is a flow chart with which an exemplary embodiment of the method of the invention is described below. This involves a variant method in which a check is first made as to whether or not a misfire has occurred, that is done by means of a first subgroup of cylinder-specific submethods. If an unequivocal finding cannot be made, then in a second method step the result is checked, using a second subgroup, by means of cylinder-independent submethods.

DESCRIPTION OF THE PREFERRED EMBODIMENTS

Referring now to the single figure of the drawing in detail, there is seen a course which the method follows. As an example, the following methods have been selected as cylinder-specific submethods for detecting misfiring:
   evaluation of non-concentricity (LU) of a crankshaft
   monitoring of an ignition current to individual cylinders (ZSR);

and the following methods have been selected as cylinder-independent submethods for detecting misfiring:
   monitoring the vibration (VI) of the engine; and
   monitoring an exhaust gas composition (with a lambda sensor signal LA). In a method step S1, the first subgroup of methods, that is the cylinder-specific submethods called "monitoring non-concentricity (LU)" and "monitoring the ignition current to the individual cylinders (ZSR)" are carried out in parallel.

If none of the submethods indicate a misfire, then in a method step S2, through a report to the statistical portion (in a method step S3), a return is made to a beginning A of the method once again.

However, if at least one of the submethods of this subgroup indicates a misfire, then in the method step S2 a jump is made to a method step S4, where a weighting value IWWZ is obtained from one or more weighting graphs for this method, for the submethod of the ignition current monitoring ZSR, as a function of the current operating point of the vehicle. This value is a measure of the reliability with which this method can correctly detect a misfire, at the current or present operating point of the vehicle.

In the individual submethods, this reliability depends on various operating parameters. In the example given herein, of ignition current monitoring, it depends, for instance, on the rpm n, the load (measured through an air mass LM), and a coolant temperature TKW.

Next, in a method step S5, for the non-concentricity LU submethod, a weighting value IWWL is obtained for one or more weighting graphs for this method, again as a function of the current operating point of the vehicle. This value is a measure for the reliability with which this method can correctly detect a misfire at the current operating point of the vehicle. In the case of the submethod for monitoring non-concentricity LU being discussed herein, this reliability depends on the following parameters: rpm n, load (measured through the air mass LM), and condition of the road (Weg).

When the various operating parameters are ascertained, it may again be necessary to carry out various methods in parallel. For instance, the condition of the road, and in particular the existence of a stretch of bad road, is ascertained in the exemplary embodiment described herein by detection of the wheel acceleration and by evaluating the fluctuations in the tank pressure. These methods likewise have varying reliability depending on the vehicle operating state, so that once again weighting may be provided as in the method described above.

If one of the submethods has not detected any misfiring, then the applicable weighting value is set to zero in the corresponding method step S4 or S5.

In principle, this method for obtaining reliability values can be employed in all of the methods that depend on the vehicle operating point, as long as the dependence of the reliability of the various methods can be ascertained statistically in advance, for instance on a test bench, and these ascertained values can then be accessed in stored form.

The weighting value IWWZ of the submethod for monitoring the ignition current ZSR and the weighting value IWWL of the submethod for monitoring non-concentricity LU are added in a method step S6 to make a first reference value RW.

In a method step S7, a comparison then takes place of the first reference value RW with a first limit value GW, which in the exemplary embodiment has been selected as one.

If the reference value RW is greater than or equal to the limit value GW ($\geq 1$), then the misfire is confirmed. In a method step S8, this is reported to a statistical evaluation program, and a return to the beginning A of the method is made.

The statistical evaluation program adds up the misfires for the various cylinders. If, in comparison with the proper firing of this cylinder, these misfires exceed a predeterminable limit value, then control measures are taken, such as shutting the fuel injection to that cylinder.

If the reference value $RW < 1$, then in a method step S9 it is compared with a lower range value BW, which in the exemplary embodiment has been selected as 0.5. If it is lower than this range value BW, then the misfire is not confirmed. In a method step S10 this is reported to the statistical evaluation, and a return is made to the beginning A of the method.

If the reference value $RW > 0.5$, that is if it is between the range value and the limit value ($0.5 \leq RW < 1$), then a reliable statement cannot be made as to whether or not a misfire has occurred. In that case, a check is then made by means of a second subgroup of cylinder-independent submethods.

In the exemplary embodiment, a submethod is employed with which the engine vibration VI is monitored, as well as a submethod that monitors the exhaust gas composition LA, for instance from the signal of the lambda sensor (in a method step S11). If none of these methods indicates a misfire, then in a method step S12 the combustion misfire report is not confirmed. This is reported to the statistical evaluation (in a method step S13), and a return is again made to the beginning A of the method.

However, if at least one of the submethods indicates a misfire, then a jump is made from the method step S12 to a method step S14. In this case and in the next method step S15, as already described above for the cylinder-specific submethods, a weighting value (UVVW and UWWL, respectively) is ascertained, from one or more weighting graphs for the applicable submethod as a function of the current vehicle operating point. This weighting value is a measure for the reliability with which that submethod can correctly detect a misfire at the current operating point of the vehicle. In the case of the various submethods, this reliability is again dependent on various operating parameters. In the example of vibration monitoring VI given herein, it is dependent, for instance, on the rpm n, the vehicle speed v, and the road condition (Weg). In the method for monitoring the mixture composition LA, it depends on the coolant temperature TKW.

The weighting values UWWV and UWWL that are obtained are added in method step S16 to make a second reference value RW2.

In a method step S17, if this second reference value RW2 is greater than a predeterminable second limit value GW2, the misfire report is confirmed, this is reported to the statistical evaluation (in a method step S18), and a return is made to the method beginning A.

If the second reference value RW2 is less than the second limit value GW2, then the misfire report is not confirmed. That is reported to the statistical evaluation (in a method step S19), and a return is made to the beginning A of the method.

Accordingly, if the cylinder-independent submethods do not likewise detect a misfire with adequate reliability, then it is highly probable that a misdetection occurred in the cylinder-specific submethods. The misfire report is not confirmed.

We claim:

1. A method for monitoring a report of misfires in an internal combustion engine through at least two different submethods, which comprises:
    forming one subgroup from at least two mutually different submethods of detecting misfires in an internal combustion engine of a vehicle;
    assigning a weighting graph containing weighting values dependent on operating parameters of the vehicle to each of the at least two submethods, the values being a measure of reliability of a report of the submethod;
    reading a weighting value out of the associated weighting graph upon each report in a submethod;
    adding the weighting values of the submethods of one subgroup to make a reference value; and
    comparing the reference value formed by adding the weighting values of the submethods with a limit value, and confirming a misfire report of misfires in the internal combustion engine if the reference value is greater than the limit value.

2. The method according to claim 1, which comprises furnishing another reference value from another subgroup having at least one further submethod and another limit value, and confirming the misfire report if:
    the reference value of the first-mentioned subgroup is between its limit value and a range value being below it, and
    the other reference value is above the other limit value.

3. The method according to claim 2, which comprises carrying out the submethods of the first-mentioned subgroup cylinder-specifically, and carrying out the submethods of the other subgroup cylinder-independently.

4. The method according to claim 2, which comprises carrying out the submethods of the first-mentioned subgroup cylinder-independently, and carrying out the submethods of the other subgroup cylinder-specifically.

5. The method according to claim 1, which comprises carrying out the following submethods for cylinder-specific detection of misfiring:
    evaluating non-concentricity of a crankshaft;
    monitoring ignition current to individual cylinders;
    monitoring a combustion chamber pressure of the individual cylinders;
    monitoring combustion by means of photography;
    measuring ion current at the spark plug; and
    monitoring injection valves.

6. The method according to claim 1, which comprises carrying out the following submethods for cylinder-specific detection of misfiring:
    monitoring an exhaust gas temperature;
    monitoring an exhaust gas composition;
    monitoring vibration of an engine; and
    monitoring noise production by the engine.

7. The method according to claim 1, which comprises delivering the confirmed misfires to a statistical evaluation, and taking control measures and bringing about an indication, if a predeterminable limit value is exceeded.

* * * * *